United States Patent
Forutanpour

(10) Patent No.: US 8,498,486 B2
(45) Date of Patent: Jul. 30, 2013

(54) RESPONSE TO DETECTION OF BLUR IN AN IMAGE

(75) Inventor: Babak Forutanpour, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 486 days.

(21) Appl. No.: 12/403,126

(22) Filed: Mar. 12, 2009

(65) Prior Publication Data

US 2010/0232706 A1 Sep. 16, 2010

(51) Int. Cl.
G06K 9/48 (2006.01)
H04N 5/228 (2006.01)
H04N 5/222 (2006.01)

(52) U.S. Cl.
USPC ............... 382/199; 348/208.1; 348/333.04

(58) Field of Classification Search
USPC .............. 382/199; 348/333.04, 208.1–208.99
See application file for complete search history.

(56) References Cited

U.S. PATENT DOCUMENTS

| | | | |
|---|---|---|---|
| 5,227,835 A | 7/1993 | Anagnostopoulos | |
| 6,101,332 A | 8/2000 | Satoh | |
| 6,516,154 B1 | 2/2003 | Parulski et al. | |
| 6,597,428 B1 | 7/2003 | Adachi et al. | |
| 7,356,254 B2 | 4/2008 | Aoyama | |
| 7,362,354 B2 | 4/2008 | Lin | |
| 2002/0181024 A1* | 12/2002 | Morimoto et al. | 358/3.15 |
| 2004/0119852 A1 | 6/2004 | Shin | |
| 2004/0201699 A1* | 10/2004 | Parulski et al. | 348/207.99 |
| 2005/0192924 A1 | 9/2005 | Drucker et al. | |
| 2005/0243350 A1* | 11/2005 | Aoyama | 358/1.9 |
| 2005/0243351 A1* | 11/2005 | Aoyama | 358/1.9 |
| 2006/0045381 A1 | 3/2006 | Matsuo et al. | |
| 2007/0115349 A1* | 5/2007 | Currivan et al. | 348/14.08 |
| 2007/0154096 A1 | 7/2007 | Cao et al. | |
| 2007/0166020 A1* | 7/2007 | Quan et al. | 396/52 |
| 2007/0252907 A1* | 11/2007 | Hsu | 348/248 |
| 2008/0024643 A1 | 1/2008 | Kato | |

(Continued)

FOREIGN PATENT DOCUMENTS

| | | | |
|---|---|---|---|
| JP | 2003345340 A | * | 12/2003 |
| JP | 2005309559 A | | 11/2005 |
| JP | 2006099404 A | | 4/2006 |
| JP | 2008092299 | | 4/2008 |

OTHER PUBLICATIONS

International Search Report and Written Opinion—PCT/US2010/027214—International Search Authority—European Patent Office—Jun. 11, 2010.
Taiwan Search Report—TW099107356—TIPO—Mar. 25, 2013.

Primary Examiner — Lin Ye
Assistant Examiner — Chia-Wei A Chen
(74) Attorney, Agent, or Firm — Matthew Evans; James R. Gambale, Jr.

(57) ABSTRACT

A system and method to respond to detection of blurry regions of interest in an image are disclosed. One embodiment includes a region locator to locate one or more regions of interest in an image captured by a digital image capturing device. The embodiment also includes a blurry region detector for detecting whether a region of interest is blurry. A blurry region indicator indicates to a user when a blurry region has been detected. When a blurry region is detected, a display interface provides an enlarged image of the detected blurry region. Some embodiments provide recommendations on how to capture the scene again with improved results.

24 Claims, 10 Drawing Sheets

U.S. PATENT DOCUMENTS

| | | | |
|---|---|---|---|
| 2008/0050032 A1* | 2/2008 | Okuno et al. | 382/266 |
| 2008/0137982 A1* | 6/2008 | Nakajima | 382/264 |
| 2008/0303936 A1* | 12/2008 | Muramatsu et al. | 348/335 |
| 2009/0060329 A1* | 3/2009 | Nakajima et al. | 382/170 |
| 2009/0232401 A1* | 9/2009 | Yamashita et al. | 382/199 |
| 2010/0054533 A1* | 3/2010 | Steinberg et al. | 382/103 |
| 2010/0085475 A1* | 4/2010 | Madnani et al. | 348/448 |
| 2010/0092100 A1* | 4/2010 | Madnani | 382/255 |

* cited by examiner

RESPONSE TO DETECTION OF BLUR IN AN IMAGE

FIELD

The present disclosure is generally related to blur detection in an image.

DESCRIPTION OF RELATED ART

A camera or other image capturing device, such as for example, a camera phone, may provide auto focus capabilities and hand jitter reduction features to aid the user in taking a good picture. Nevertheless, sometimes a picture may be blurry or a region in the picture that a user desires to be in focus may not be in focus. In some conventional cameras, an active display on the camera shows the image "seen" by the camera to give the user a good idea of the quality of the picture the user is about to take. Sometimes, however, it may be difficult to tell when a region of interest that is small relative to the size of the active display is out of focus when viewing a display of the entire scene to be captured. Because of this, it is common for a user to take a picture only to find out later, after the picture has been transferred to a desktop computer or laptop with larger display that the picture is of too poor of quality to be shared with friends or printed.

SUMMARY

Embodiments herein provide methods and devices for detecting a blurry region of an image, such as a blurry face, and displaying a close up of the blurry region on a display so that the user can more clearly view the blurry region. In some embodiments, close ups of several detected blurry regions may be displayed, as well as displaying next to a blurry region, a region that is determined to be sharp for comparison. Displaying a close up of a blurry region enables a user of the device to more clearly see that a blurry region is in the scene and to elect to retake the picture. Embodiments described herein overcome the problem of a user taking a picture that appears good on the active display of the picture-capturing device and finding out only later that there is a blurry region in the picture. Notification may be provided to the user if a blurry region is detected upon completion of algorithms for locating a region of interest and analyzing the region to determine if the region is blurry.

In a particular embodiment, an apparatus is disclosed for detecting and displaying a close up of a blurry region of an image. The apparatus includes a region locator to locate one or more regions of interest in an image captured by a digital image capturing device. The apparatus also includes a blur detector to detect when one or more located regions is blurry. For example, the blur detector may determine that a located region is "too blurry" based on a ratio of soft edges to hard edges detected in the located region. The apparatus further includes an indicator responsive to the blur detector to generate a signal in response to detection of a blurry region. The apparatus also includes a display interface to provide an enlarged image of the blurry region to a display device.

In another particular embodiment, a method is disclosed that includes locating one or more regions of interest in a captured image. The method also includes detecting one or more blurry regions among the located regions of interest. The method further includes generating a user notification signal in response to detecting a first blurry region, and generating an enlarged image of the first blurry region to be displayed by a display device.

In another particular embodiment, a computer readable tangible medium includes computer code that causes a computer to detect a blurry region of an image. The computer code further causes the computer to provide a notification of the detected blurry region and causes the computer to initiate display of an enlarged image of the detected blurry region.

In another particular embodiment, an apparatus includes means for detecting a blurry region of a digitized image. The apparatus further includes means responsive to the detecting means for generating a notification of the detected blurry region. The apparatus also includes means for initiating display of an enlarged image of the detected blurry region.

Thus, one particular advantage provided by disclosed embodiments is presenting an enlarged view of a detected blurry region that a user can more clearly view.

Other aspects, advantages, and features of the present disclosure will become apparent after review of the entire application, including the following sections: Brief Description of the Drawings, Detailed Description, and the Claims.

DETAILED DESCRIPTION

Figure 1:
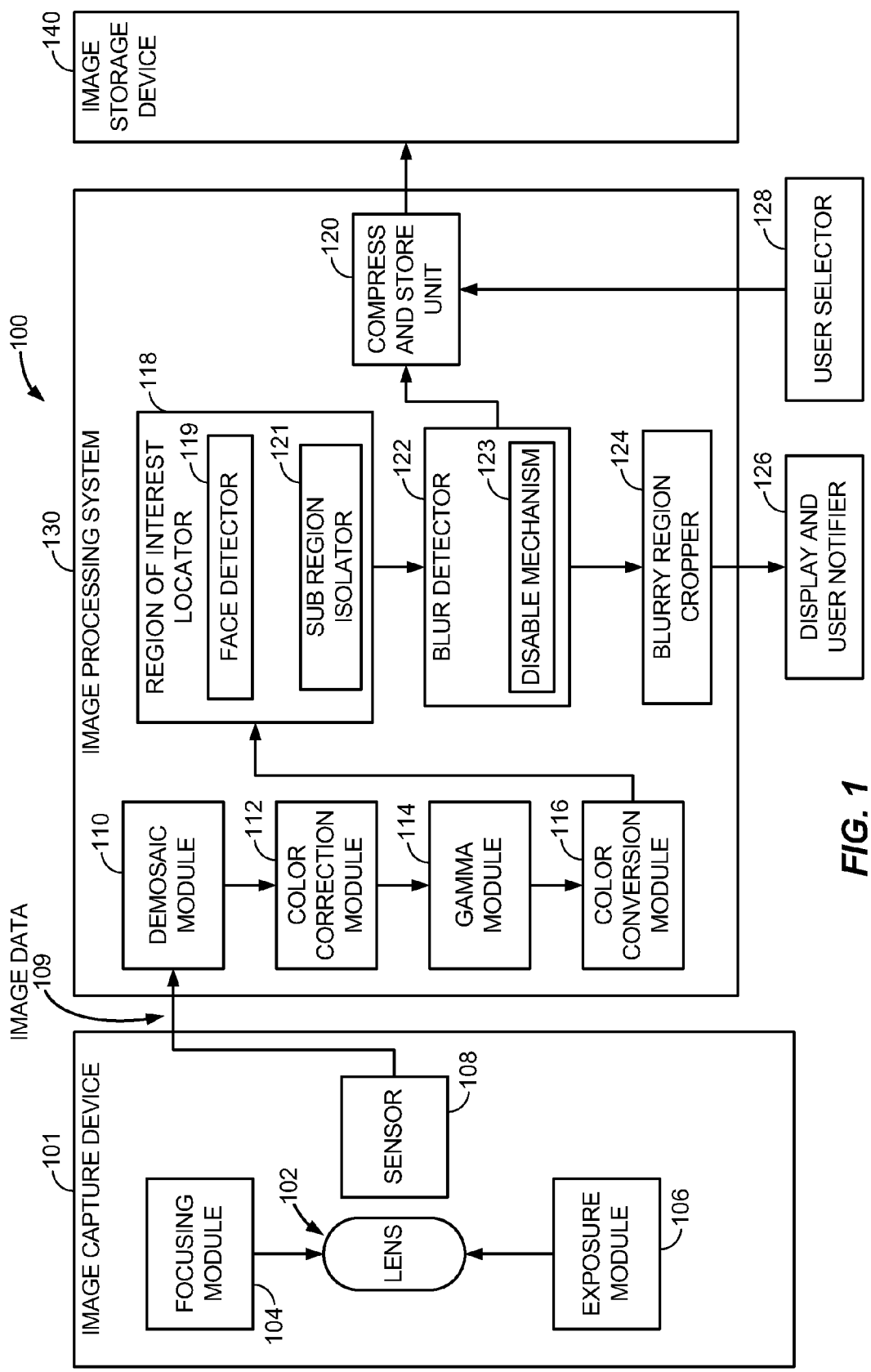
FIG. 1 is a block diagram of an embodiment of an image capturing and processing system.

FIG. 1 is a block diagram of an embodiment of an image capturing and processing system including an image processing system 130 having a region of interest locator 118 and a blur detector 122. The system 100 includes an image capture device 101 coupled to the image processing system 130. The image processing system 130 is coupled to an image storage device 140. The image processing system 130 is configured to receive image data 109 from the image capture device 101 and to process the received image data 109 by performing operations on the image data 109 that include detecting a region of the image and determining whether the region is blurry. Generally, the system 100 may be implemented in an electronic device that is configured to perform real-time image processing using relatively limited processing resources.

In a particular embodiment, the image capture device 101 is a camera, such as a video camera or a still camera. In other embodiments, the image capture device 101 may be a camera embodied in a cellular telephone, personal digital assistant (PDA), or other portable electronic device. The image capture device 101 includes a lens 102 that is responsive to a focusing module 104 and to an exposure module 106. A sensor 108 receives light via the lens 102 and generates the image data 109 in response to an image received via the lens 102. The focusing module 104 may be responsive to the sensor 108 and may be adapted to automatically control focusing of the lens 102. The exposure module 106 may also be responsive to the sensor 108 and may be adapted to automatically control an exposure of the image. In a particular embodiment, the sensor 108 includes multiple detectors, or pixel wells, that are arranged so that adjacent detectors detect different colors of light. For example, received light may be filtered so that each detector receives red, green, or blue incoming light.

The image capture device 101 provides the image data 109 to the image processing system 130. The image processing system 130 includes a demosaic module 110 to perform a demosaic operation on the image data 109 received from the image capture device 101. A color correction module 112 is configured to perform color correction on demosaiced image data. A gamma module 114 is configured to generate gamma corrected image data from data received from the color correction module 112. A color conversion module 116 is coupled to perform a color space conversion to the gamma corrected image data and to provide resulting image data to the region of interest locator 118. A compress and store module 120 is coupled to receive an output of the blur detector 122 and to store compressed output data at the image storage device 140. The image storage device 140 may include any type of storage medium, such as one or more display buffers, registers, caches, flash memory elements, hard disks, any other storage device, or any combination thereof.

The region of interest locator 118 is configured to execute an algorithm for detecting a region of interest in the picture. More particularly, in a particular embodiment, the region that the region of interest locator 118 locates may be a face that is detected by a face detector 119. In a particular embodiment, the region of interest locator 118 also includes a sub region isolator 121. The sub region isolator 121 may provide isolation of one or more sub regions within a region of interest found by the region of interest locator 118. For example, the region of interest locator 118 may first locate a face. Then, the sub region isolator 121 may isolate a region about an eye of the face as a sub region of interest. Thus, in some embodiments, the region of interest locator 118 locates a face and in some embodiments the region of interest locator 118 locates a particular part of the face such as an eye or a mouth.

The blur detector 122 operates to detect a blurry region in the image data. The blur detector 122 detects whether any of the regions located by region of interest locator 118 are blurry. The blur detector 122 may segment the located region into sub regions and determine if each sub region is blurry or not. In another embodiment, the blur detector 122, does not segment a region into sub regions. Rather, the region may be analyzed as a whole. If a blurry region of the image is detected, a blurry region cropper 124 crops the blurry region so that that the blurry region may be displayed "close up" by a display and user notifier 126. That is, a substantially larger area of the available display area may be occupied by the cropped blurry region. Displaying a close up of the blurry region enables the user to more clearly see the blurry region than if the entire scene occupied the view of the display. Thus, an enlarged image of the blurry region may be displayed. In some embodiments, the blur detector 122 includes a disabling mechanism 123 to disable detection of blurry regions. Disabling the blur detector 122 may conserve power consumed by image processing system 130.

The display and user notifier 126 may be configured to notify the user of the camera that a blurry region is detected. The notification may include, for example, a sound, a light, vibration, or a statement that a blurry region has been detected. The image is passed to the compress and store unit 120, which is responsive to a user selector 128. The user selector 128 is configured to receive input from the user indicating whether the user wishes to retain or discard the image. The user selector 128 also may allow the user to adjust a threshold for blurry region detection, in some embodiments. If the user selects to retain the image, a signal is sent to the compress and store unit 120 to cause the compress and store unit 120 to compress the image and to store the image at the image storage device 140.

Thus, in a particular embodiment, the image processing system 130 executes an algorithm to detect a region of interest, such as a face. The image processing system 130 further executes an algorithm to detect a blurry region among the detected regions of interest. For example, a face that is out of focus may be particularly unpleasant to a viewer of the image. More particularly, whether the eyes are in focus may impact the quality of the viewing experience. A located region is analyzed to determine if it is blurry. If the located region is blurry, the region is cropped and presented by the image processing system 130 to a display. The blurry region is displayed so as to occupy a much larger area of the display than it would occupy if the entire scene were displayed.

Figure 2:
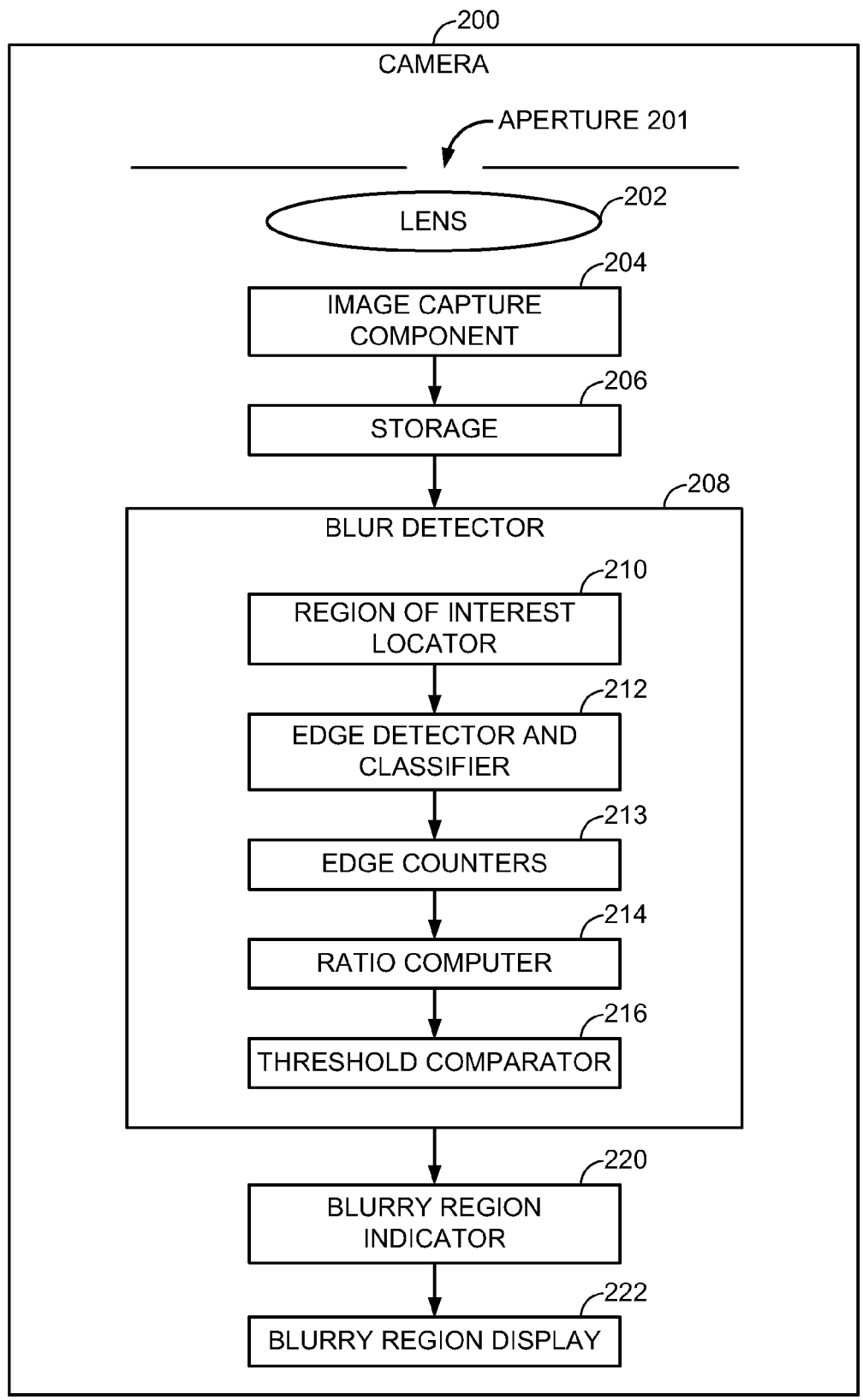
FIG. 2 is a block diagram of an embodiment of a camera that detects blurry regions.

FIG. 2 is a block diagram of an embodiment of a camera 200 that detects blurry regions. The camera 200 includes an aperture 201, a lens 202, an image capture component 204, and storage 206. The image capture component 204 may include a charge coupled device. The camera 200 further includes a blur detector 208, a blurry region indicator 220 and a blurry region display 222. The aperture 201 adjusts the amount of light that enters the camera 200. The image capture component 204 is responsive to the image passing through the lens 202 to convert the image into electronic signals to be stored at the storage 206.

In a particular embodiment, a region of interest locator 210 is a component of the blur detector 208. The region of interest locator 210 is configured to locate one or more regions of interest in the image captured by the camera 200. The region of interest locator 210 may implement one of a plurality of detection algorithms known in the art or to be developed in order to locate a region of interest. In some embodiments, a region of interest can be a face. Thus, in some embodiments, the user is given a choice to detect faces in the image. In some embodiments, the user may disable the blur detector 208. If the user selects to detect faces, then a sub region isolator not shown in FIG. 2 may be employed to locate, for example, an eye, mouth or nose.

In some image capturing devices, face detection is performed in an image preview mode by an algorithm that operates quickly at low resolution so as not to delay the taking of the picture. In some embodiments, this preview mode face detection is enhanced by the use of an algorithm that takes a little longer to complete but yields more accurate results. Thus, a preview mode face detector may operate to locate faces in a picture. Then, a post preview mode face detector operates on the image where the faces were located with lower resolution by the preview mode face detector. Further, the preview mode may not be able to detect a face of a person when his or her head is tilted. The preview mode face detector may operate over a duration of about 33 milliseconds, whereas the longer, more accurate algorithm may take about 2 seconds to complete. Thus, the preview mode face detector may not be robust enough to detect all faces in an image. In some embodiments, immediately after the high-resolution picture is taken and before the picture is encoded, the more accurate face detector runs with an improved capability to detect all the faces in the image, regardless of pose, and evaluates the level of sharpness of the faces. For example, even if the face detector in the preview mode is able to detect all the faces given strict real-time constraints, face detection in the preview mode does not necessarily mean the faces captured in the snapshot will in fact be in focus due to subject or photographer's hand motion just as the picture is captured. It may therefore be advantageous to analyze the final snapshot before the photographer leaves the scene.

Accordingly, the blur detector 208 includes an edge detector and classifier 212. In one embodiment, an edge detector computes four first-order derivatives for each pixel in the region to achieve detection of edges in the detected region. The edge detector and classifier 212 is capable of determining whether a given pixel should be classified as being part of a soft edge, hard edge, or is not classified as being part of an edge. Generally, a hard edge indicates a feature that is in focus and a soft edge indicates a feature that is not in focus or that is otherwise blurry due to, for example, motion of the camera user's hand while taking the picture, the camera focusing on background elements instead of the main subject of interest, or the subject moving during image capture.

Note that while some embodiments may be especially adapted to detect blurry faces, some embodiments may be especially adapted to detect blur in other objects of interest, such as, for example trees, or fish in underwater applications. Further, some embodiments may be adapted to evaluate sub regions other than facial features, such as, for example leaves on a plant or scales on a fish.

The blurry region detector 208 further includes edge counters 213. One counter of the edge counters 213 counts a number of soft edges detected in a region of the detected face by the edge detector and classifier 212 and another counter of the edge counters 213 counts a number of hard edges detected in the region by the edge detector and classifier 212. A ratio computer 214 of the blur detector 208 is configured to compute a ratio of the number of soft edges to the number of hard edges detected in the region of the face detected by the region of interest locator 210. A threshold comparator 216 is configured to compare the ratio that the ratio computer 214 computes to a threshold. In some embodiments, the threshold is thirteen. In some embodiments, the user sets the threshold. If the ratio is greater than the threshold, the region is deemed to be blurry; otherwise the region is deemed to be sharp.

In some embodiments, a region is not segmented into sub regions. Rather, the numbers of hard and soft edges in the region are counted and the ratio of the number of soft edges to the number of hard edges is compared to a threshold to determine if the region is blurry. In other embodiments, a region of interest, such as a face, is segmented into the sub regions of an eye and a mouth. The total soft edges of the eye sub region are added to the total soft edges of the mouth sub region and the total hard edges of the eye sub region are added to the total hard edges of the mouth sub region. The remaining sub regions of the face may not be evaluated. If the total number of soft edges exceeds the total number of hard edges by a threshold value, the face is treated as blurry and is displayed in an enlarged size.

A blurry region indicator 220 is configured to notify the user of the camera 200 if a blurry region is detected. This notification may be a light or a sound that emanates from the camera 200 upon blurry region detection. In addition to notifying the user of a detected blurry region, the blurry region display 222 may display an enlarged view of the detected blurry region (e.g., a close up view). That is, the blurry region may be cropped and enlarged to occupy a larger area of the display so that the blurry region is displayed with greater resolution.

Thus, in a particular embodiment, an apparatus detects and indicates a blurry region in an image. The apparatus includes a blur detector to detect a blurry region of the image. In some embodiments, the blurry region is a face of a person whose picture is being taken. The blur detector further includes an edge detector to detect edges in the region. The edge detector may compute first-order derivatives of the signal at various points to detect edges in some embodiments. A detected edge is classified as either a soft edge or a hard edge. The blur detector includes logic to identify a first number of soft edges and a second number of hard edges in the region. The blur detector may further include a comparator to compare the ratio of the first number of soft edges to the second number of hard edges to a threshold to determine if the ratio is above the threshold. In some embodiments, the threshold is specified by a user of the apparatus. Also, the blur detector may count a number of blurry sub regions and non-blurry sub regions in a region, and classify the region as blurry if the number of blurry sub regions exceeds the number of non-blurry sub regions.

In some embodiments, a region is not broken up into sub regions, but rather, the number of soft and hard edges is determined for the region as a whole and a ratio of the soft to hard edges is compared to a threshold. In some embodiments, less than all sub regions of a region are evaluated for the presence of blur and a region is deemed blurry if a sub region or just some sub regions are blurry. An indicator responsive to the blur detector detecting a blurry region generates a user notification at the apparatus in response to the detected blurry region. In some embodiments, the user may be able to disable the blur detector, thereby conserving power when the blur detector is not needed.

Figure 3:
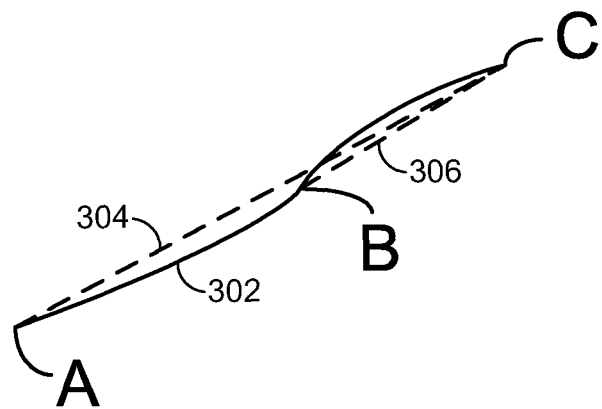
FIG. 3 is an illustration of an embodiment of a hard edge and a soft edge and the slopes of line segments used to characterize an edge as hard or soft.
Figure 3:
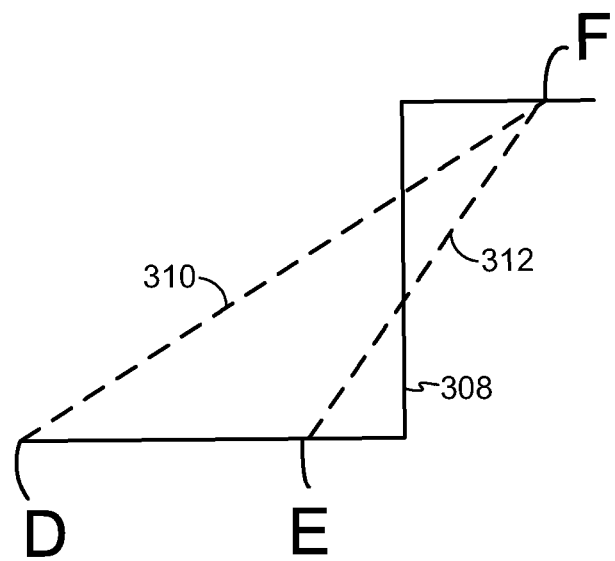

FIG. 3 is an illustration of an embodiment of a hard edge and a soft edge and the slopes of line segments used to characterize an edge as hard or soft. FIG. 3 shows a particular embodiment of a soft edge 302 and a hard edge 308. An image processing system 130 (e.g., the image processing system 130 of FIG. 1) detects points A, B and C of the soft edge 302.

This detection may be conducted by using five point edge detectors in some embodiments. One particular example of the kernel used for the edge detection is:

$$\begin{pmatrix} 0 & 0 & 0 & 0 & 0 \\ -1 & 0 & -1000 & 0 & 1001 \\ -2 & 0 & -2000 & 0 & 2002 \\ -1 & 0 & -1000 & 0 & 1001 \\ 0 & 0 & 0 & 0 & 0 \end{pmatrix}$$

for detecting an edge in a horizontal direction, and:

$$\begin{pmatrix} 0 & -1 & -2 & -1 & 0 \\ 0 & 0 & 0 & 0 & 0 \\ 0 & -1000 & -2000 & -1000 & 0 \\ 0 & 0 & 0 & 0 & 0 \\ 0 & 1001 & 2002 & 01001 & 0 \end{pmatrix}$$

for detecting an edge in a vertical direction. The kernel used may be of higher or lower dimensions. Note that a 5×5 kernel may not be sufficient to accurately distinguish between hard and soft edges for large faces. In some embodiments, all detected faces are normalized to a given size such as, for example, 100×126 pixels. In some embodiments, a 5×5 edge detector is used to detect soft edges, and a 3×3 edge detector is used to detect hard edges.

To illustrate the operation of the edge detecting kernel given above, an example of a matrix of pixel values giving rise to a soft edge, such as the soft edge 302, is given by:

$$\begin{pmatrix} 10 & 20 & 30 & 40 & 50 \\ 10 & 20 & 30 & 40 & 50 \\ 10 & 20 & 30 & 40 & 50 \\ 10 & 20 & 30 & 40 & 50 \\ 10 & 20 & 30 & 40 & 50 \end{pmatrix}$$

Summing the product of the pixel values in the first column of this soft edge matrix of pixel values with the numerical values in the first column of the 5×5 kernel yields the result of −40 (=−1×10−2×10−1×10). Summing the product of the pixel values of columns 3 yields −120,000 (=−1000×30−2000×30−1000×30). Summing the product of the pixel values of columns 5 yields 200,200 (1001×50+1002×50+1001×50. Summing these three results yields 80,160. This number is divided by 1000 to yield 80 with a remainder of 160. The first of these values, 80, is normalized by a factor of two to compensate for the fact that the distance across the image from A to C is twice as great as B to C. Thus, 80 is multiplied by two, yielding 160. This results in the pair of numbers 160 and 160. The ratio of these two numbers is exactly one, meaning the points are co-linear and hence, a smooth edge. In one embodiment, ratios between 0.8 and 1.2 are used as thresholds to classify an edge as soft. To illustrate, the soft edge 302 may be described as soft because the line BC 306 is almost parallel to line AC 304, and therefore the ratio of the slopes is between 0.8 and 1.2.

With respect to the hard edge 308, an example of a matrix of pixel values giving rise to this hard edge is:

$$\begin{pmatrix} 10 & 10 & 10 & 50 & 50 \\ 10 & 10 & 10 & 50 & 50 \\ 10 & 10 & 10 & 50 & 50 \\ 10 & 10 & 10 & 50 & 50 \\ 10 & 10 & 10 & 50 & 50 \end{pmatrix}$$

Performing edge detection on this block of pixels using the same 5×5 kernel as before, yields the pair of numbers, 320 and 160. In this case, the ratio of the slope of line EF 312 to the slope of line DF 310 is greater than one and exceeds a threshold, indicating a hard edge. Note that other kernels can be used for edge detection and other edge detection methods may be employed that are now known or to be developed in the future.

Figure 4:
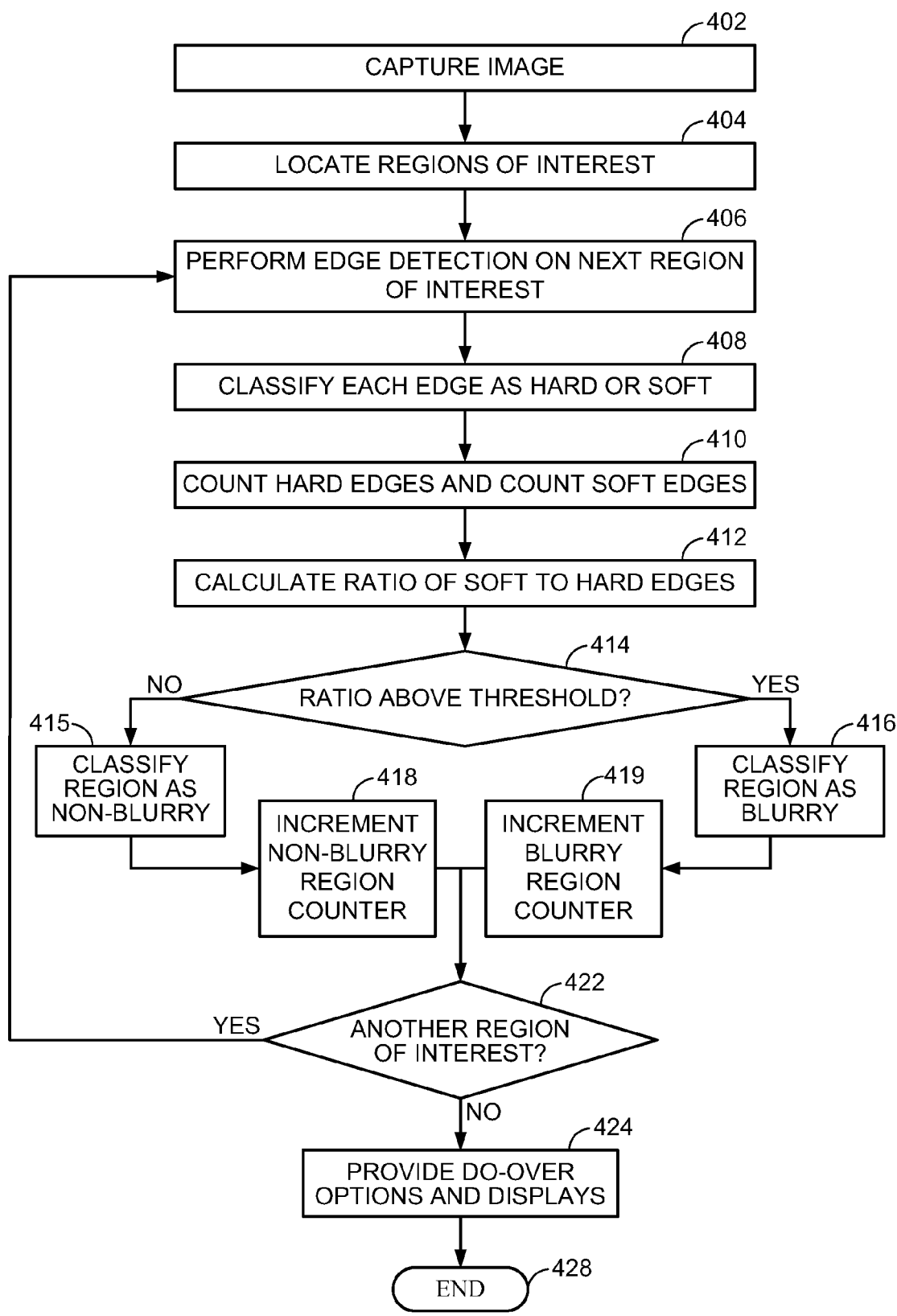
FIG. 4 is a flow chart of an embodiment of a method of capturing an image and determining if the image contains a blurry region.

FIG. 4 is a flow chart of an embodiment of a method of capturing an image and determining if the image contains a blurry region. Beginning at 402, the image is captured by a user. Continuing to 404, a region of interest locator algorithm to locate one or more regions of interest in the image is applied. Advancing to 406, edge detection is performed on regions of interest that have been found. In some embodiments, a region of interest is analyzed as a whole. In other embodiments, a region is segmented into multiple sub regions and some or all of the sub regions are analyzed separately, with the results then combined for the region. Moving to 408, each detected edge is classified as hard or soft. Proceeding to 410, the number of soft edges and the number of hard edges are counted. Next, at 412, the ratio of the number of soft edges in a region to the number of hard edges in the region is calculated.

Continuing to 414, if the ratio of soft to hard edges is below a threshold, then the region is classified as non-blurry, at 415, and a non-blurry region counter is incremented at 418. Otherwise, the region is classified as blurry, at 416, and a blurry region counter is incremented at 419. Continuing to 422, if there is another region of interest not yet analyzed, the process loops back to 406, where edge detection is performed on the next region of interest. If all the regions that are located have been evaluated by edge detection, then at 424, the system will provide do over options and displays as will be discussed more fully with reference to FIGS. 5, 6, 7, and 8. The process ends at 428.

In some embodiments, a region of interest may be a face. The face can be segmented into sub regions so that one sub region contains an eye, and another sub region contains a mouth, for example. In a particular embodiment, when a face is detected as a region of interest, the number of hard edges in the eye sub region and the number of hard edges in the mouth sub region are added together and the number of soft edges in the eye sub region and the number of soft edges in the mouth sub region are added together. If the ratio of the soft edges to the number of hard edge pixels is greater than some threshold, such as a threshold of thirteen for faces, the region of interest may be tagged as blurry. Otherwise, the face is classified as sharp. Thus, in some embodiments, a decision whether the region is blurry depends on analysis of less than all sub regions of the region.

Therefore, an apparatus may include means for detecting a blurry region of a digitized image, means responsive to the detecting means for notifying a user of the apparatus of the detected blurry region, and means for providing a display of an enlarged view of the detected blurry region. Means for performing these functions may include application specific circuitry or a digital processor executing suitable instructions or a combination of a digital processor and application specific circuitry. Application specific circuitry may include a programmed logic device. Means for storing the image may include random access memory or other storage medium. In some embodiments, means for detecting a face region in the digitized image and for performing edge detection of the face region may also include application specific circuitry or a digital processor. Means for displaying an enlarged image of the detected blurry region may include a flat panel display or other display mechanism.

Figure 5:
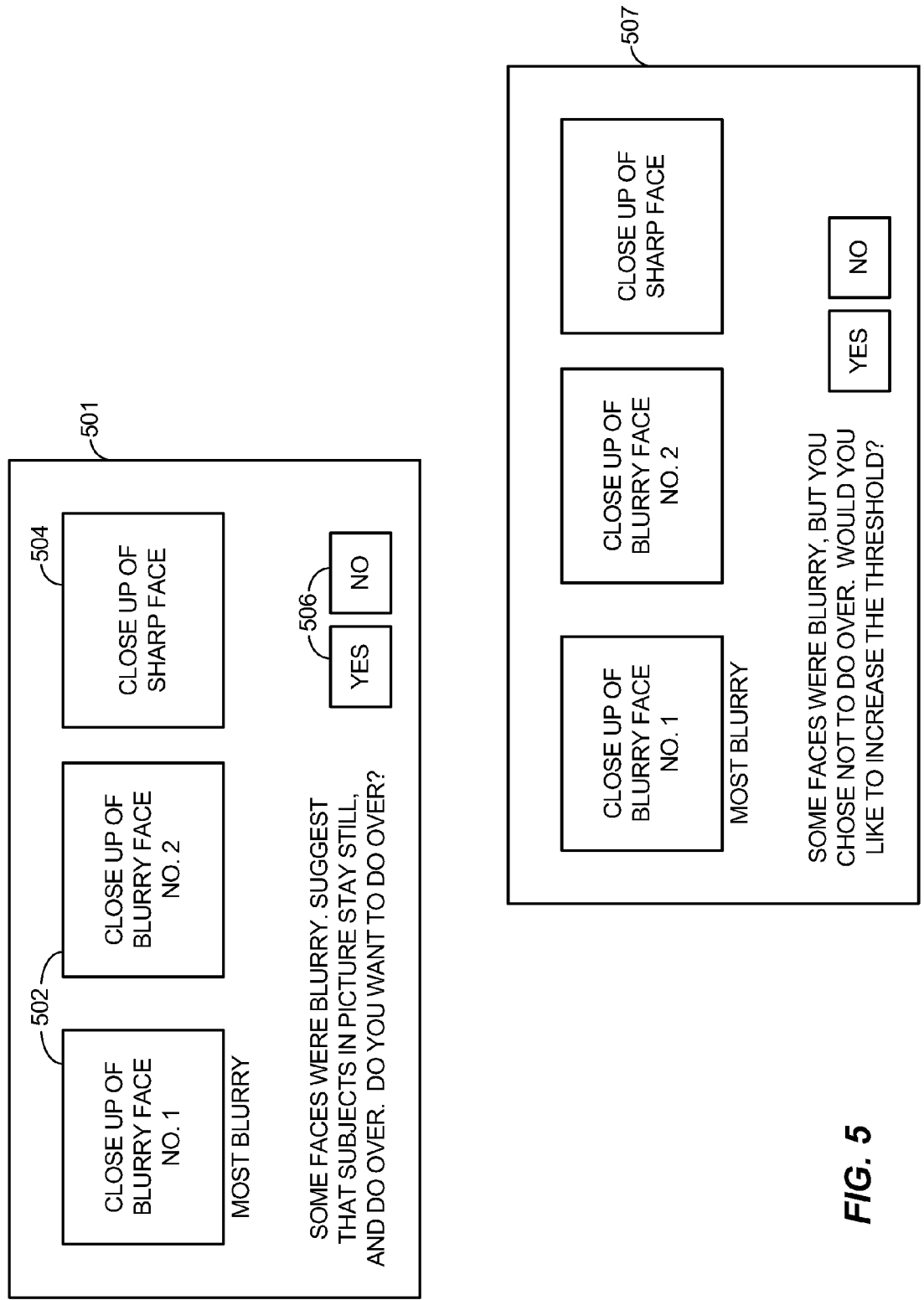
FIG. 5 is a diagram of an embodiment of a graphical user interface to display blurry faces and a sharp face for comparison.

FIG. 5 is a diagram of an embodiment of a graphical user interface to display blurry faces and a sharp face for comparison. The interface is used by a device such as the system 100 of FIG. 1, the camera 200 of FIG. 2, and the system 800 which will be described with reference to FIG. 8. In particular, FIG. 5 shows a first interface 501 that may be displayed by a camera (e.g., the camera 200 of FIG. 2) in the event the camera detects two blurry faces and one sharp face. Both blurry faces 502 and a sharp face 504 are displayed so that the user of the camera can compare them. Note that because only detected regions of the entire scene are displayed, rather than the entire scene, the displayed detected regions may occupy a larger area of the display, and can therefore be seen more clearly and with greater resolution.

In the embodiment illustrated, the display 501 includes a statement to the effect that "Some faces were blurry. Suggest that subjects in picture stay still and do over. Do you want to do over?" The user may select Yes or No using buttons 506. For example, the options shown by the buttons 506 may be provided in a touch sensitive screen, or by use of a navigate and select function. If the user selects Yes, then the most recently taken image data may be deleted from memory and the user simply takes the picture over again. If the user selects No, then the second interface 507 may be displayed, including a statement that reads: "Some faces were blurry, but you chose not to do over. Would you like to increase the threshold?" The second interface 507 gives the user the option to increase the threshold to which the ratio of soft to hard edges is compared, thereby tuning the system so in the future the blurry detection mechanism is less strict when categorizing regions of interest as blurry. If the user selects Yes to this option, another display enabling the setting of the threshold may be displayed.

In one embodiment, the display may further indicate which of a plurality of blurry regions is the most blurry. Thus, in FIG. 5, blurry face number one is shown to be the most blurry. The most blurry region among a plurality of blurry regions may be determined by selecting the blurry region with the lowest ratio of soft to hard edges. Alternatively, as another example, the most blurry region may be determined by selecting the blurry region with the highest ratio of the number of blurry sub regions in the region to the number of non-blurry sub regions in the region. Other metrics may be employed to determine which region is most blurry.

Figure 6:
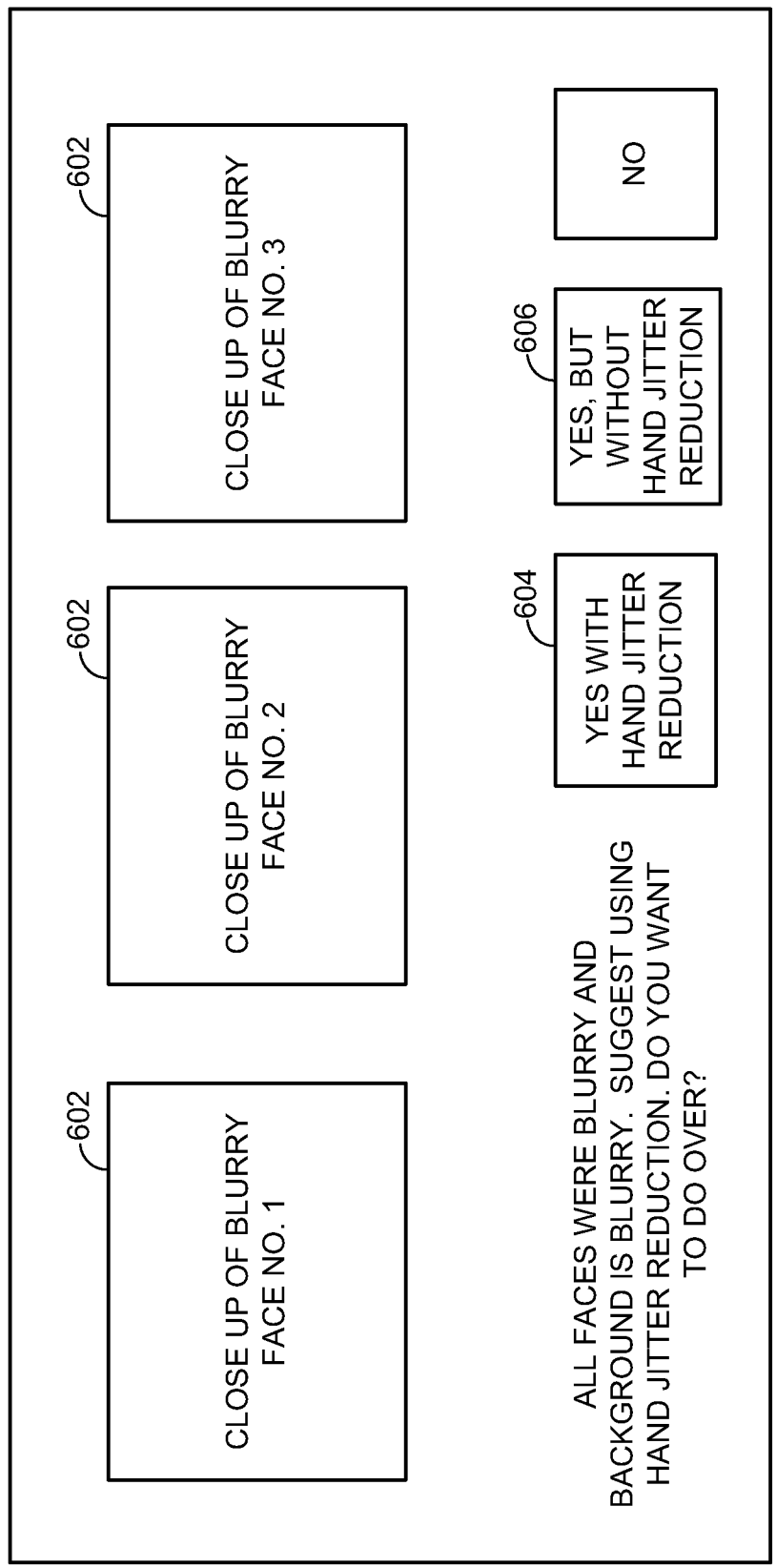
FIG. 6 is a diagram of an embodiment of a graphical user interface to display blurry regions of an image.
Figure 7:
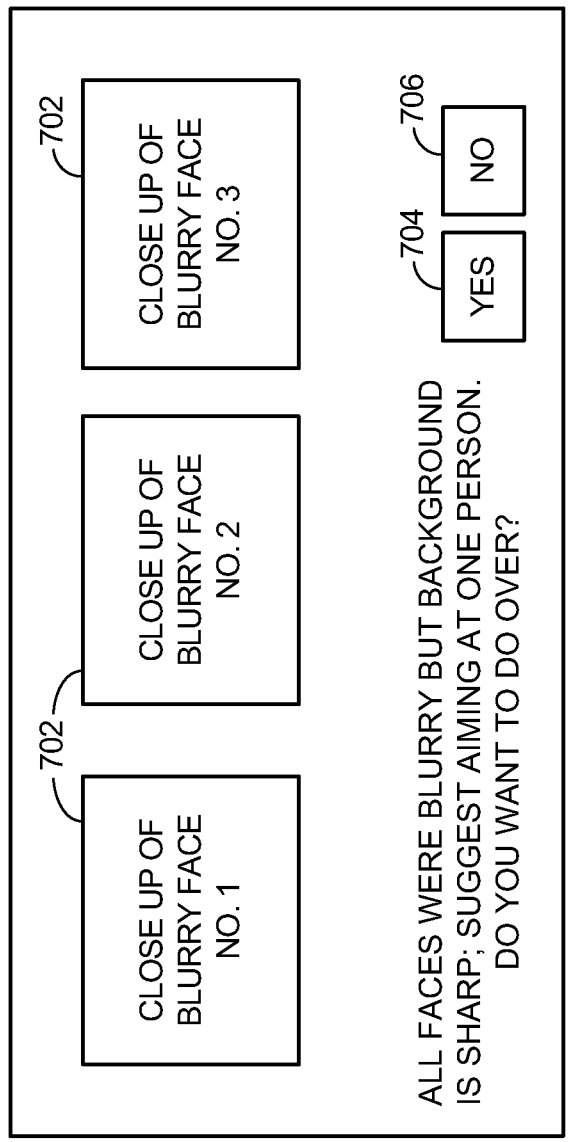
FIG. 7 is a diagram of an embodiment of a graphical user interface to display blurry regions of an image.

FIG. 6 is a diagram of an embodiment of a graphical user interface to display blurry regions that may be the result of hand jitter. In particular, FIG. 6 shows that all the faces 602 in an image were determined to be blurry. This could result from a jerky hand motion while taking the picture. As will be discussed with reference to FIG. 8, when all the faces are blurry a determination may be made whether the whole picture is blurry. If the whole picture is not determined to be blurry, then the display of FIG. 7 is shown. If the whole picture is blurry, then the user is presented with the statement of FIG. 6: "All faces were blurry and background is blurry. Suggest using hand jitter reduction. Do you want to do over?" One option 604 the user may select is to take the picture over again with a hand jitter reduction (HJR) algorithm operating to reduce jitter due to hand motion occurring while taking the picture. Alternatively, the user may select option 606 to take the picture again without hand jitter reduction, or the user may select No to retain the picture.

FIG. 7 is a diagram of an embodiment of a graphical user interface to display blurry regions 702 that may be the result of focusing on an object other than a face in the picture. For example, the user may have aimed the camera between two faces, inadvertently focusing on a tree in the background. When all the faces are blurry, therefore, the camera determines whether a background feature is sharp. If so, then the message is displayed: "All faces were blurry but background is sharp. Suggest aiming at one person. Do you want to do over?" The user may then select whether to take the picture again or not using buttons 704 and 706.

Figure 8:
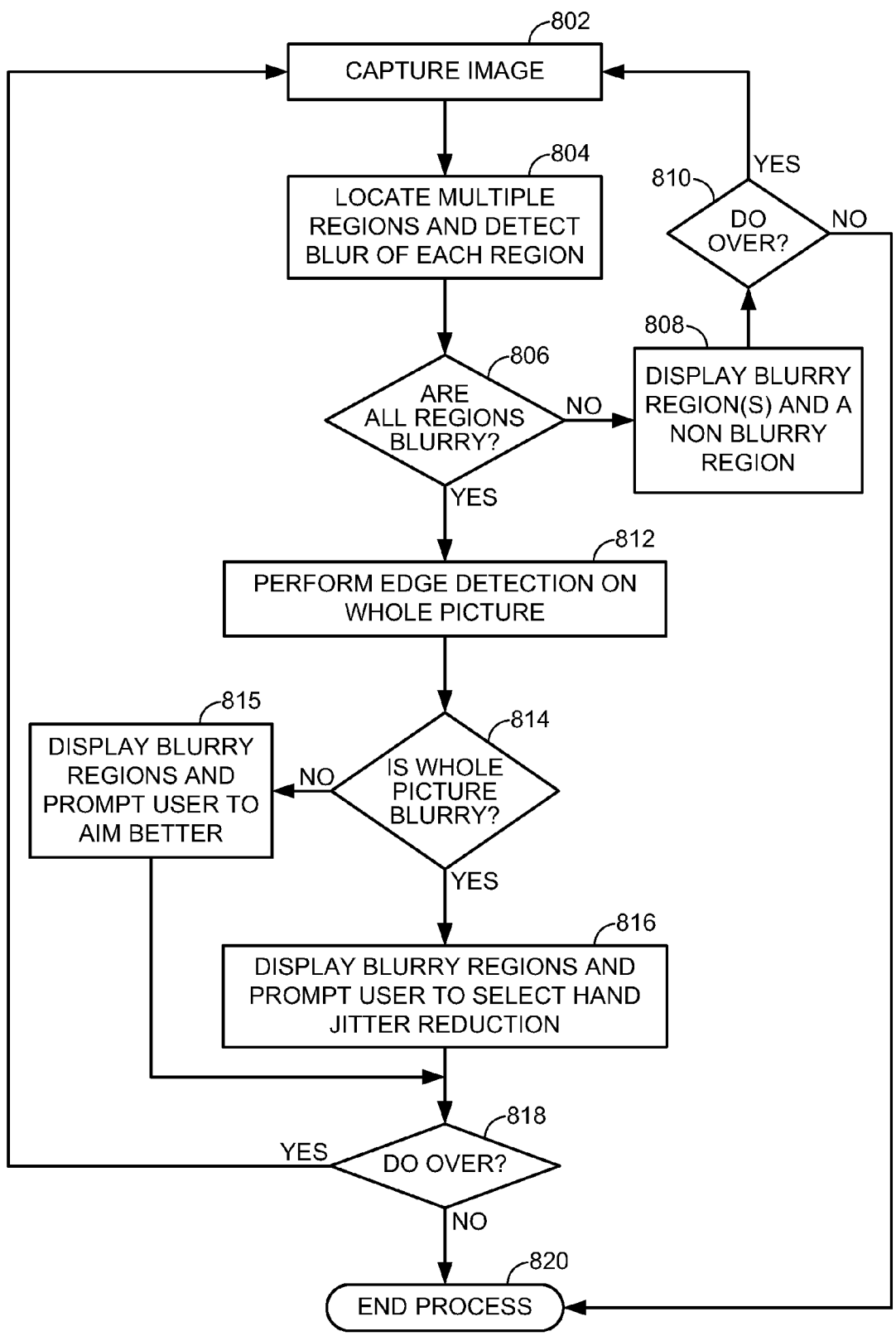
FIG. 8 is a flow chart of an embodiment for evaluating blurry regions in a image.

FIG. 8 is a flow chart of an embodiment for evaluating blurry regions in a picture. Starting at 802, an image or picture is captured. At 804, multiple regions of interest are located in the picture and each region is evaluated for blur. Continuing at 806, a determination is made whether all regions are blurry. If not all regions are blurry, then at 808, at least one of the blurry regions is displayed along with a non blurry region. Moving to 810, the user can then decide whether to take the picture over again. Thus, if, for example, two faces are blurry and one face is not blurry, the two blurry faces can be displayed with the non blurry face as shown in FIG. 5. Because one face is not blurry, the likelihood is that the two people whose faces are blurry moved during image capture, and it is unlikely that the two blurry faces are the result of the motion of the hands of the picture taker. If the user decides to take the picture again, the process advances to 802. Otherwise, the process ends at 820.

Continuing at 806, if all located regions are blurry, then at 812, edge detection may be performed on the image outside the located regions. If all the located regions of the picture are determined to be blurry, a cause could be that the picture taker's hand moved, or a cause could be that the auto focus feature of the camera failed to capture the desired focus. If the blur is caused by hand jitter, then features in the image outside of the located regions will be blurry as well. Blurriness outside the located regions can be detected using edge detection performed on the image outside the located regions. Thus, at 812, edge detection is performed on the whole image. At 814, if the whole picture is blurry, blurry regions are displayed and the user is given an option to take the picture over again with Hand Jitter Reduction on, at 816. If the user elects to take the picture again, at 818, the process returns to 802. Otherwise, the process ends at 820. Continuing at 815, if some regions of the image are not blurry—for example, if there is a tree in the scene that is not blurry—then blurry regions are displayed. The user may be prompted to aim the camera to better focus on a desired target, at 818. If the user elects to retake the picture, the process returns to 802. If the user does not elect to take the picture over again, the process ends, at 820.

Note that in some embodiments, when no blurry region is detected, the camera may display non-blurry regions and a statement as follows: "No blurry regions have been detected. Would you like to decrement the threshold?" Then, the user may select Yes or No. If the user selects yes, the threshold is decremented by one, and the user can then take the picture again.

Thus, in some embodiments, if all regions of interest are blurry, then edge detection upon the entire captured image is performed. If edge detection on the entire captured image indicates the whole picture is blurry, then a user is provided with the option to capture the image again using a hand jitter reduction algorithm. If edge detection on the entire captured image indicates sharp features outside the regions of interest, then the user is advised to aim the camera better.

Figure 9:
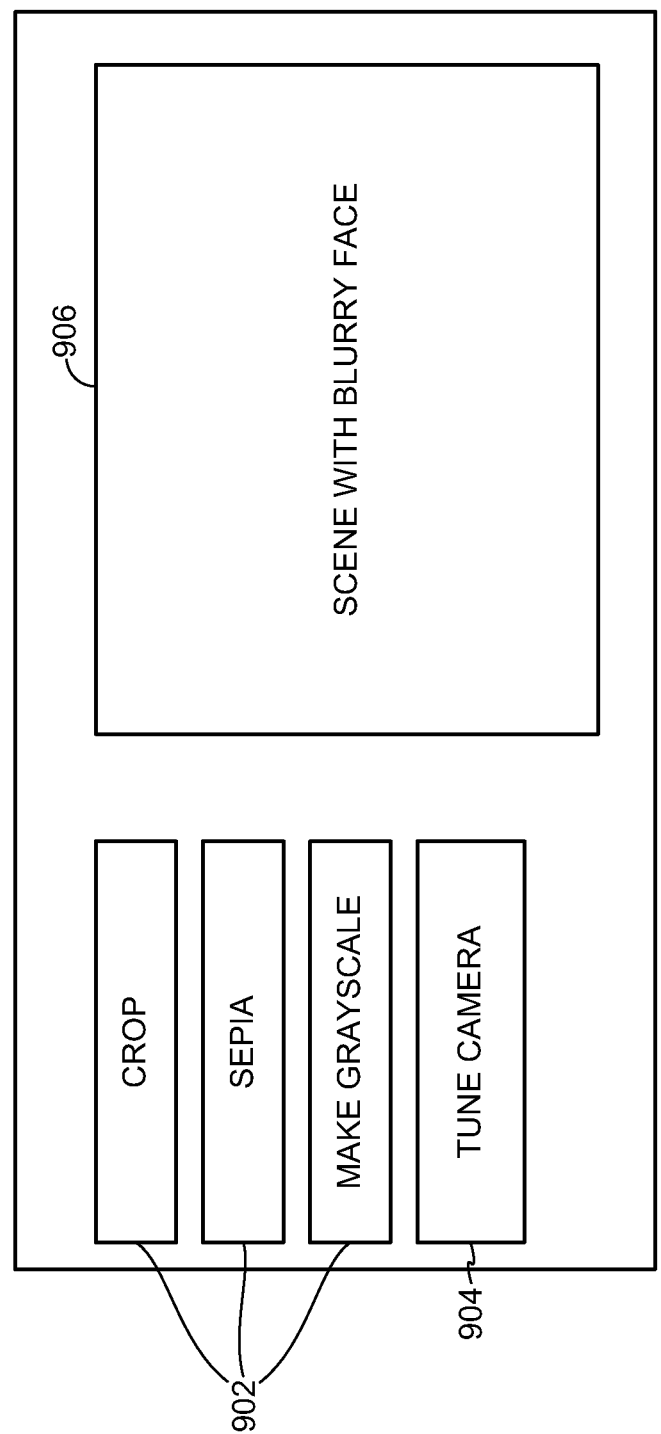
FIG. 9 is a diagram of an embodiment of a graphical user interface that allows a user to tune a camera by specifying a threshold.

FIG. 9 is a diagram of an embodiment of a graphical user interface that allows a user to tune a camera (e.g., the camera 200 of FIG. 2) by specifying a threshold. The display of FIG. 9 may be provided by a computer used for viewing the images captured by the camera or may be provided by the camera in a "photo album mode." In the display of FIG. 9, a blurry picture 906 is shown. Options 902 are available to the user for editing including "crop", "sepia" and "make grayscale" options. Another option 904 labeled "tune camera" is provided. By selecting this option, the user may adjust the threshold to which the ratio of soft to hard edges is compared. Increasing the threshold decreases the likelihood that a region will be considered blurry, and decreasing the threshold increases the likelihood that a region will be considered blurry. For example, a user viewing an image of a scene on a computer that was taken by a camera may discover that the image contains a blurry region that was not detected by the blur detector of the camera, and choose to decrease the soft edge to hard edge ratio from the factory default to something lower, thereby making the algorithm more susceptible to flagging blurry regions in the future. In a particular embodiment, selection of the "tune camera" option 804 causes an interface to be displayed that allows the user to select the threshold. In another embodiment, selection of the "tune camera" option 804 enables the user to incrementally adjust the threshold.

Figure 10:
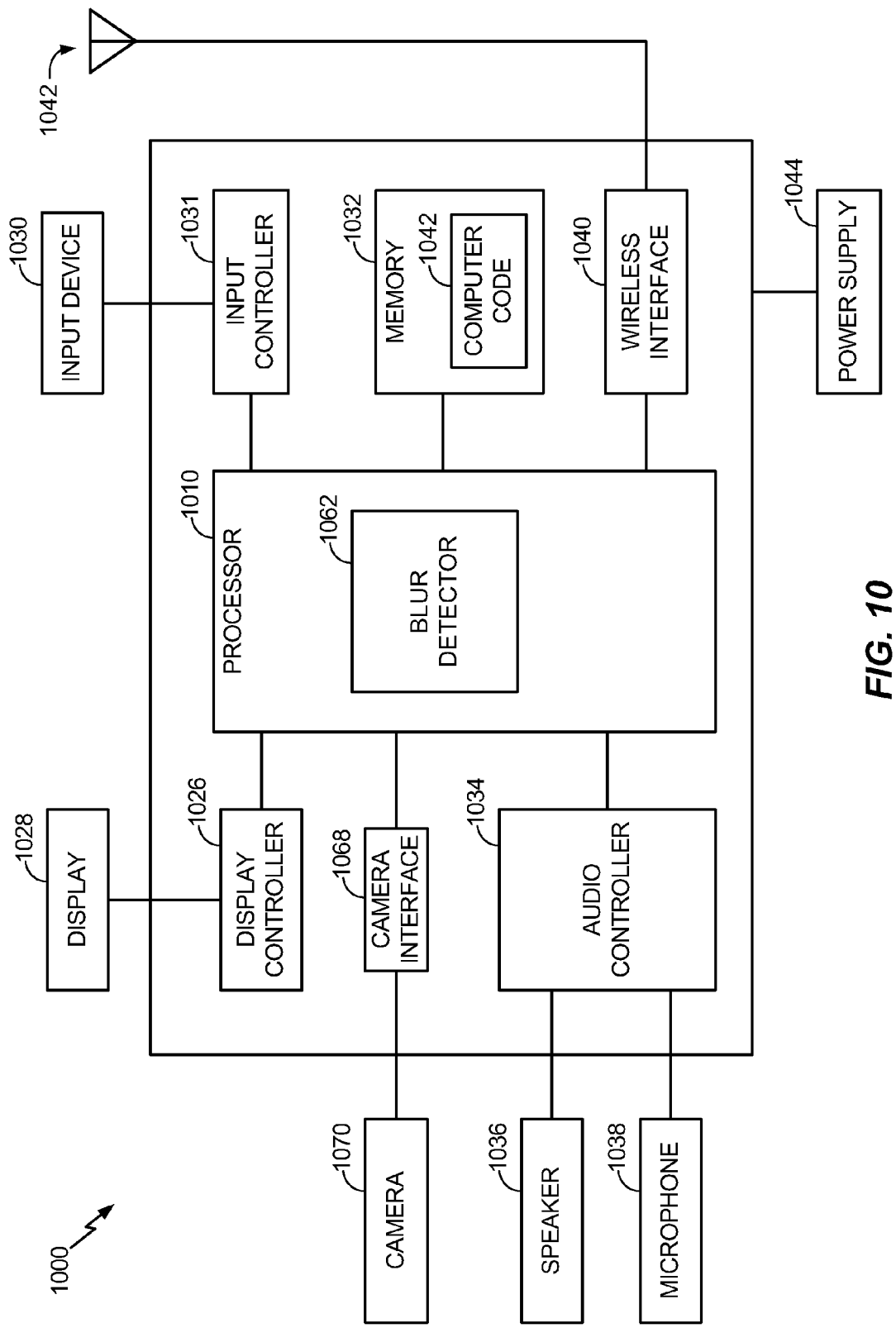
FIG. 10 is a block diagram of an embodiment of a wireless communication device having a blur detector and a display to display an enlarged image of a detected blurry region.

FIG. 10 is a block diagram of an embodiment of a wireless communication device having a blur detector and a display to display an enlarged image of a detected blurry region. The system 1000 may be implemented in a portable electronic device and includes a processor 1010, such as a digital signal processor (DSP) or microcontroller, coupled to a memory 1032. The memory 1032 is a readable, tangible medium to store computer code 1042 that, when executed by the processor 1010, causes the processor to perform operations for blurry region detection and to perform other processes. The processor 1010 includes a blur detector 1062, such as the blur detector 122 of FIG. 1 or the blur detector 208 of FIG. 2. The processor 1010 may notify a user of a detected blurry region by making a sound through a speaker 1036 or by providing a light or providing a display on the display 1028, such as one or more of the user interfaces shown in FIGS. 5, 6, and 7.

A camera interface 1068 is coupled to the processor 1010 and is also coupled to a camera 1070. The camera 1070 may be a video camera or a still image camera or may implement both functionalities. A display controller 1026 is coupled to the processor 1010 and to a display device 1028. An audio controller 1034 can also be coupled to the processor 1010. A speaker 1036 and a microphone 1038 can be coupled to the audio controller 1034. A wireless interface 1040 can be coupled to the processor 1010 and to an antenna 1042. An input device 1030 for receiving and coupling inputs to the system 1000 may also be coupled to system 1000 by an input controller 1031.

During operation of the system of FIG. 10, a user may take a picture using the camera 1070. The image data captured by the camera 1070 is coupled by way of a camera interface 1068 to a processor 1010. The blur detector 1062 within the processor 1010 may detect one or more blurry regions in the resulting image according to computer code 1042 stored in the memory 1032. The display 1028 may display an enlarged image of the detected blurry regions. The input device 1030 may enable the user to elect to keep the picture with the blurry region or to take the picture over again. Images captured by the camera 1070 may be transmitted by the system 1000 wirelessly by way of the wireless interface 1040 and an antenna 1042. The captured images also may be stored in memory 1032.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

Thus, one embodiment is computer readable tangible medium that includes computer code to cause the computer to detect a blurry region of an image. The computer code further causes the computer to provide a notification of the detected blurry region. The computer code may further cause the computer to determine if a ratio of a number of soft edges to a number of hard edges exceeds a threshold before classifying a region containing the hard and soft edges as blurry or non-blurry. The computer code causes an enlarged image of the detected blurry region to be displayed.

The previous description of the disclosed embodiments is provided to enable any person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. An apparatus with a display device, comprising:
a region locator configured to locate one or more regions of interest in an image captured by a digital image capturing device;
a blur detector configured to detect whether one or more of the located regions of interest are blurry, wherein the blur detector comprises an edge detector to detect one or more edges in the one or more located regions of interest and wherein each detected edge is classified as one of a soft edge and a hard edge and wherein the blur detector is further configured to compare a ratio of a first number of detected soft edges to a second number of detected hard edges to a threshold, wherein the threshold is adjustable by a user of the apparatus; and
a display interface configured to display on the display device:
one or more enlarged images of the one or more located regions of interest;
one or more statements indicating a suggested user action based at least in part on the located regions of interest; and
one or more options configured to receive input from a user, wherein the one or more options are based at least in part on the suggested user action.

2. The apparatus of claim 1, wherein the edge detector includes logic to compute four first-order derivatives for each pixel in the one or more located regions of interest.

3. The apparatus of claim 1, wherein the blur detector includes logic to identify a first number of soft edges and a second number of hard edges in a sub region of one or more of the located regions of interest.

4. The apparatus of claim 1, wherein at least one blurry region of interest is displayed beside a non-blurry region of interest for comparison.

5. The apparatus of claim 1,
wherein the blur detector is further configured to:
determine whether all located regions of interest are blurry;
in response to determining that all located regions of interest are blurry, to determine if a region outside of the located regions of interest is blurry; and
wherein the display interface is further configured to display on the display device an option to take another picture using a hand jitter reduction algorithm in response to the blur detector determining that a region outside of the located regions of interest is blurry.

6. The apparatus of claim 1, wherein the image is captured by a component of the apparatus.

7. The apparatus of claim 1, further comprising a disable mechanism to disable detection of blurry regions.

8. The apparatus of claim 1, further comprising a camera to capture the image.

9. The apparatus of claim 1,
wherein the blur detector is further configured to:
determine whether all located regions of interest are blurry;
in response to determining that all located regions of interest are blurry, to determine if a region outside of the located regions of interest is not blurry; and
wherein the display interface is further configured to display on the display device:
a statement suggesting a user aim the camera towards at least one region of interest in response to the blur detector determining that a region outside of the located regions of interest is not blurry; and
an option to take another picture in response to the blur detector determining that a region outside of the located regions of interest is not blurry.

10. The apparatus of claim 1,
wherein the blur detector is further configured to:
determine whether a first located region of interest is not blurry; and
in response to determining that the first located region of interest is not blurry, to determine whether a second located region of interest is blurry; and
wherein the display interface is further configured to display on the display device:
a statement suggesting a user direct a subject of the image to remain still in response to the blur detector determining that a second located region of interest is blurry; and
an option to take another picture in response to the blur detector determining that a second located region of interest is blurry.

11. The apparatus of claim 1, wherein the one or more regions of interest comprise one or more human faces.

12. A method comprising:
locating one or more regions of interest in a captured image;
detecting one or more blurry regions among the located regions of interest wherein detecting the one or more blurry regions further comprises determining a first value corresponding to a number of soft edges in a first located region of interest and determining a second value corresponding to a number of hard edges in the first located region of interest, and comparing a ratio of the first value and the second value to a threshold;
displaying on a display device one or more enlarged images of the one or more located regions of interest;
displaying on the display device one or more statements indicating a suggested user action, wherein the one or more statements indicating a suggested user action are based at least in part on the located regions of interest;
displaying on the display device one or more options configured to receive input from a user, wherein the one or more options are based at least in part on the suggested user action.

13. The method of claim 12, further comprising computing four first-order derivatives for each pixel in the one or more regions of interest and using the four first-order derivatives to determine the first value and the second value.

14. The method of claim 12, further comprising:
segmenting a located region of interest into a plurality of sub regions;
determining a number of soft edges in a particular sub region among the plurality of sub regions; and
determining a number of hard edges in the particular sub region.

15. The method of claim 12, further comprising concurrently displaying an enlarged view of at least one blurry region of interest and an enlarged view of at least one region of interest that is not blurry.

16. The method of claim 12, further comprising concurrently displaying enlarged views of multiple blurry regions of interest.

17. The method of claim 12, further comprising, in response to detecting that all regions of interest are blurry, performing edge detection upon at least a portion of the captured image that is not within the one or more located regions of interest.

18. The method of claim 17, further comprising, in response to determining that the portion of the captured image that is not within the one or more located regions of interest is blurry, providing a user with an option to use a hand jitter reduction algorithm.

19. The method of claim 17, further comprising, in response to determining that the portion of the captured image that is not within the one or more located regions of interest is not blurry, generating an interface to advise a user to aim better.

20. The method of claim 12, further comprising, in response to detecting that a first region of interest is blurry and that a second region of interest is not blurry, suggesting a user direct a subject of the image to remain still.

21. A non-transitory, computer readable medium storing computer executable code, comprising:
code for causing an image capture device to locate one or more regions of interest in a captured image;
code for causing the image capture device to detect one or more blurry regions among the located regions of interest, wherein the code for causing the computer to detect the blurry region of the image comprises code for causing the image capture device to determine a first value corresponding to a number of soft edges in a first region of interest and to determine a second value corresponding to a number of hard edges in the first region of interest, and code for causing the image capture device to determine when a ratio of the first value to the second value exceeds a threshold;
code for causing the image capture device to display on a display device one or more enlarged images of the one or more located regions of interest;
code for causing the image capture device to display on the display device one or more statements indicating a suggested user action, wherein the one or more statements indicating a suggested user action are based at least in part on the located regions of interest;

code for causing the image capture device to display on the display device one or more options configured to receive input from a user, wherein the one or more options are based at least in part on the suggested user action.

22. An apparatus, comprising:

means for locating one or more regions of interest in a captured image means for detecting one or more blurry regions among the located regions of interest wherein detecting the one or more blurry regions further comprises determining a first value corresponding to a number of soft edges in a first located region of interest and determining a second value corresponding to a number of hard edges in the first located region of interest, and comparing a ratio of the first value and the second value to a threshold;

means for displaying on a display device one or more enlarged images of the one or more located regions of interest;

means for displaying on the display device one or more statements indicating a suggested user action, wherein the one or more statements indicating a suggested user action are based at least in part on the located regions of interest;

means for displaying on the display device one or more options configured to receive input from a user, wherein the one or more options are based at least in part on the suggested user action.

23. The apparatus of claim 22, further comprising means for storing the captured image.

24. The apparatus of claim 22, wherein the means for detecting the one or more blurry regions among the located regions of interest comprises means for detecting a face region.

* * * * *